United States Patent Office 3,814,585
Patented June 4, 1974

3,814,585
METHOD AND APPARATUS FOR TESTING BLOOD COAGULATION
Robert T. Bailly, Hinman Road, Barneveld, N.Y. 13304
Filed Sept. 26, 1972, Ser. No. 292,399
Int. Cl. G01n 33/16
U.S. Cl. 23—230 B                                    10 Claims

ABSTRACT OF THE DISCLOSURE

A freshly drawn sample of venous blood is placed in a container, such as a hypodermic syringe, and a thread is moved lengthwise through the sample until a substantially continuous mass of fibrin and/or red blood cells form thereon, marking the endpoint of the test. The thread is of a material to which blood coagulation substances adhere, preferably a water wettable material such as glass, or plant or animal fibers, e.g., cotton or wool. The thread may be inserted through the needle of the syringe and an electric motor with suitable reduction gearing used to draw the thread through the needle and blood sample within the syringe at an appropriate speed, e.g., a few millimeters per minute. The endpoint may be noted visually or by electrical, optical, or any other suitable sensing means.

BACKGROUND OF THE INVENTION

The present invention relates to the testing of blood coagulation or clotting time and, more particularly, to novel and improved methods and apparatus for invitro testing of coagulation of fresh samples of venous blood.

Since the time a vessel is allowed to leak or the ease with which it may be pathogenically blocked have a great bearing on the survival of the human organism, coagulation assays, particularly those which deal with the rate of clot formation, are useful in many respects. Individual physiological differences dictate that some sort of overall assay for hemostasis be used. As noted in medical literature, the so-called "global" assays are generally better indicators of hemostatic imbalance than a series of individual tests for specific factors. Tests measuring concentrations of activities of specific factors may be used to characterize defects when an imbalance is indicated by global assays. On the assumption that the processes which lead to the development of an in vitro clot are analogous to those which produce in vivo thrombi, techniques have been developed for in vitro coagulation studies.

Although the methods previously employed have proven useful in gaining medical information on individuals from whom the samples are taken, they are generally quite subjective and time consuming. For example, one of the most widely used and accepted laboratory method involves periodically tipping or rotating end-for-end a plurality of tubes containing blood samples every thirty seconds until the blood maintains its shape when the tubes are inverted. Thus, optimum resolution is thirty seconds, five to fifteen minutes of time is required for normal samples, repeatability is not of a high order, and an operator is required to visually check the samples at each rotation. Other previously known mehods have much the same negative attributes.

Accordingly, it is a principal object of the present invention to provide a method and apparatus for in vitro testing of blood coagulation which has a much higher degree of repeatability and accuracy than prior techniques while remaining fast and simple in implementation.

A further major object is to provide blood coagulation test methods and apparatus which generally operate to provide a test endpoint in less time than conventional tests providing the same information.

Still another object is to provide test methods and apparatus for determination of blood coagulation time which may be essentially fully automated, being subject little, if at all, to human error or judgment.

A still further, and more general object, is to provide novel and improved blood coagulation test methods which may be implemented in a simple and efficient manner with relatively inexpensive and reliable equipment.

Other objects will in part be obvious and will in part appear hereinafter.

SUMMARY OF THE INVENTION

In accordance with the foregoing objectives, the invention utilizes the property of whole blood wherein the onset of clotting is characterized by the enmeshment of red cells in a fibrin network the mass of which adhere to water wettable surfaces or materials. That is, prior experimentation has indicated that a thromboplastic substance is released by contact of blood with a glass surface, while clotting is prolonged in plastic or paraffin coated tubes. The common property of materials most suitable for contact with the blood sample in coagulation testing thus appears to be water wettability.

In the present invention an elongated water wettable element, preferably in the nature of a thread, is drawn through a fresh sample of venous blood. The element is set in motion prior to contact with the sample and the elapsed time between initial contact and substantially continuous presence of fibrin, as indicated by red blood cells on the element as it emerges from the sample, is taken as the coagulation or beginning point of clotting. The distance traveled by the element, at constant speed, from initial contact to adhesion of red cells may likewise be used as the test result.

Apparatus for practicing the invention may conviently take the form of a hypodermic syringe with the thread passing through the needle and barrel to attachment with the motive means. The latter is actuated to set the thread in motion as the resin blood sample is placed in the syringe barrel, which is immersed in a circulating water bath to maintain the sample temperature at 37.5° C. The presence of the red blood cells, indicating the test endpoint, may be noted visually or by any appropriate sensing means. Since the mass of red blood cells may produce a marked increase in diameter of the thread (depending, of course, on its original diameter) conventional optical and/or electrical transducers may be used to sence and indicate such increase. Likewise, the change in conductivity resulting from the moisture content of the thread upon substantially continuous presence of the red cells and fibrin may be used for endpoint indication. Other physical attributes associated with the adhesion of the cells and fibrin to the element, such as the decrease in fluorescence of a treated cotton thread under appropriate light, may also be used for determining the endpoint. Conventional recording equipment, such as continuous chart recorders, may be connected to the sensing means to provide a continuous and permanent record of the test.

DESCRIPTION OF THE PREFERRED EMBODIMENT

Figure 1:
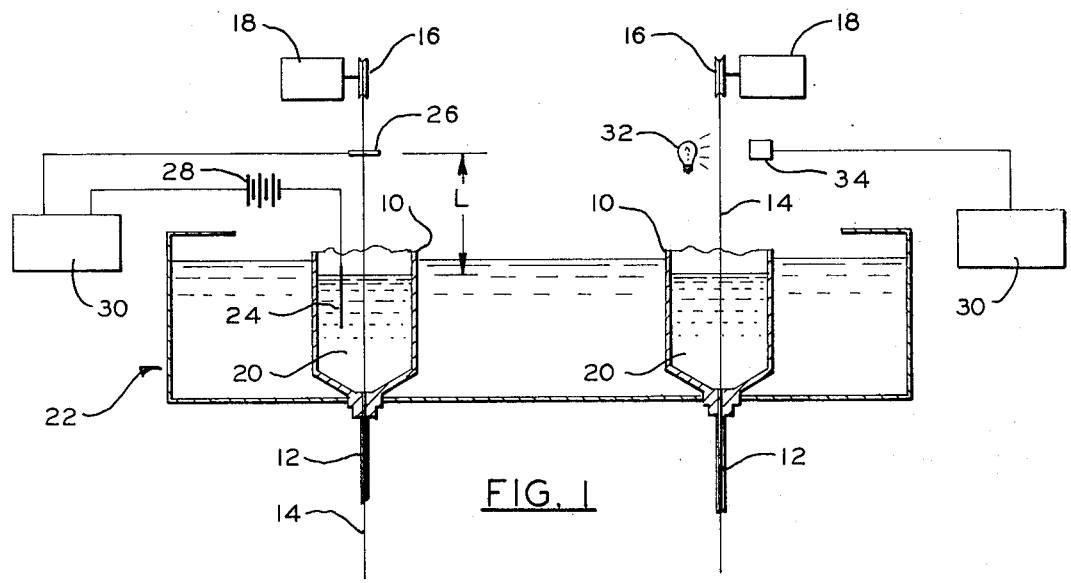
FIG. 1 is a diagrammatic-schematic illustration of apparatus suitable for practicing the invention, showing alternative means of sensing the endpoint.

The sample to be tested is drawn in conventional fashion. That is, a sufficient quantity, e.g., three milliliters, of venous blood are drawn into a suitable syringe, e.g., a 5.0 cc. plastic, non-pyrogenic syringe fitted with a 20 gage needle. Vena puncture should be conducted in one continuous motion. If for any reason the tip of the needle is not in the vein, the procedure should stop, the syringe fitted with a new needle and a second attempt made.

On completion of successful vena puncture and withdrawal of the sample, a portion thereof, e.g., 0.4 ml. is dribbled into the test container, exercising care that no bubbles are formed. Referring now to the drawing, the test container is shown in the form of glass barrel 10 of a hypodermic syringe fitted with needle 12. Two identical syringes are shown in order to illustrate alternative means of sensing the endpoint. Thread 14 is inserted through needle 12, passing through barrel 10, and is attached to pulley 16. Block 18 diagrammatically indicates the motive means for rotating pulley 16, such as a small electric motor with suitable reduction gearing.

Thread 14 may conveniently comprise a 50 gage cotton thread, which may be relatively easily threaded through a standard 23 gage hypodermic needle. The thread may be of wool, or other fibrous materials, and the gage or diameter is in no way limiting of the invention. Threads of glass and other water wettable materials are also suitable for carrying out the test procedure and need not be flexible, as indicated in the drawing.

The best results are obtained when the temperature of the blood sample under test, indicated by reference numeral 20, is maintained constant at 37.5° C. Ambient or room temperature, of course, may be maintained at this level, but it is usually more convenient to provide a circulating water bath, indicated generally by reference numeral 22, to control sample temperature. The speed of movement of thread 14 is not critical, but should be constant from test to test in order to simplify comparison of endpoint results. Speeds of from 2.49 mm./min. to 10 mm./min. have been successfully used and it would appear that satisfactory results could be obtained with either faster or slower thread spreeds.

As previously mentioned, test endpoints may be indicated in any of a variety of ways. The substantially continuous mass of blood cells and fibrin on the thread, marking the endpoint, may be visually noted with the naked eye or with the aid of an ophthalmoscope, or other such equipment. The test is less subjective, however, when sensing means employing electrical and/or optical apparatus is used rather than visual observation. Two forms of such apparatus are shown in FIG. 1 in schematic form. In the left-hand test container a first electrode 24 extends into barrel 10 and is immersed in sample 20 contained therein. Electrode 26 is positioned a distance L above the surface of sample 20 and is contacted by thread 14 as the latter is moved past the stationary electrode. A source of EMF 28 is connected between the two electrodes and the circuit is completed when a wet mass of blood coagulation substances is present on thread 14, stretching from electrode 26, down the thread, into the sample and thence to electrode 24. Any suitable indicating means may be used to show completion of the circuit, such as ammeters, voltmeters, or the like, or a chart recorder 30 may be connected in conventional fashion to provide a permanent, graphical record of the test. The change in conductivity produced by the presence of blood cells and fibrin on thread 14 may cause a marked deflection in the recording pen of recorder 30.

The right-hand syringe employs light source 32 and photocell 34 for indication of test endpoint. The increased diameter due to adhesion of coagulation particles to the thread will mask a portion of the light reaching photocell 34, thus producing a measurable change in the electrical properties thereof which, in turn, will deflect the pen of recorder 30. Other sensing means may be used if desired to signal the test endpoint in response to changes in the moisture content and/or diameter of the thread, as well as conductivity and optical property changes. For example, the fluorescence of a treated cotton thread under ultraviolet light will be masked when the thread is covered by blood cells and fibrin. This effect may be noted visually or by sensing equipment to mark the test endpoint.

Figure 2:
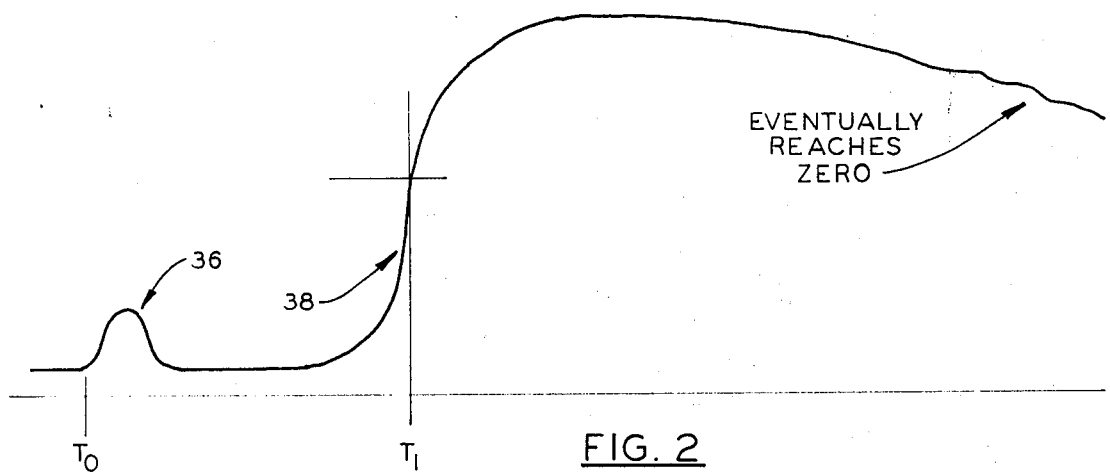
FIG. 2 is an illustration of one typical chart recording of the test.

FIG. 2 shows a typical trace of a chart recorder for a test conducted according to the present invention. When the portion of thread 14 first emerging from sample 20 reaches electrode 26 (or other sensing means) at time $T_0$ there is frequently a signal or pen deflection of small but noticeable magnitude and duration, indicated on the curve by reference numeral 36. This is believed to be caused by platelet adhesiveness and/or aggregation and could be another useful indicia associated with the test of the present invention. The test endpoint is marked by a steep positive slope 38 of the curve and the median point in this slope is taken as the endpoint time $T_1$. Thus, coagulation time is the elapsed time from $T_0$ to $T_1$ plus the time required for thread 14 to travel distance L. If a standard test setup is provided wherein distance L is always the same, the time required for the thread to travel this distance may be disregarded for comparison purposes. The distance traveled by the thread between $T_0$ and $T_1$ may likewise be used as the number indicating the onset of clotting.

Figure 3:
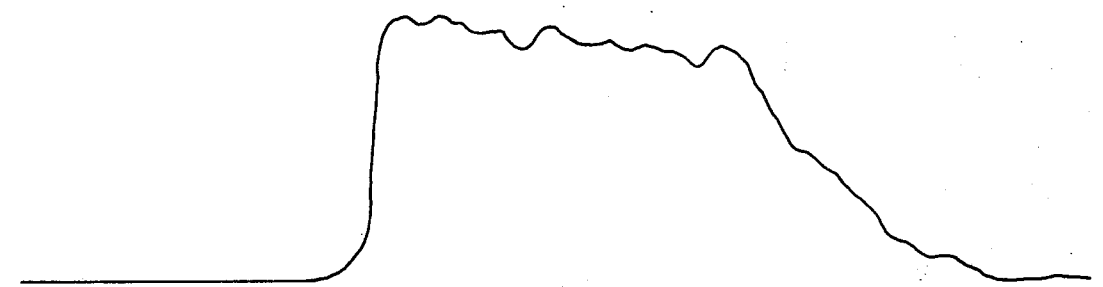
FIG. 3 is an illustration of another chart recording.

It may also be useful to note or measure characteristics such as the degree of duration of clotting. Such information can be particularly useful, for example, when testing the effects of anti-coagulants, and the like, or the blood of particular subjects. The chart trace in FIG. 3 will indicate not only the time to onset of clotting, but the relative degree of clotting by the magnitude of the peak, and the duration by the time required for the signal to return to its beginning level. Thus, for example, when heparin, or other anti-coagulants, are added to the sample it would be expected that fibrin would be formed and withdrawn from the sample on the thread more slowly. Therefore, the increase in thread diameter (and corresponding magnitude of the sensing signal) should not be as great as the amount of heparin is increased, but it would last longer.

Although several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A method of testing blood coagulation comprising the steps of:
    (a) extracting a raw blood sample;
    (b) drawing an elongated element to which coagulation substances will adhere lengthwise through said sample; and
    (c) measuring the time interval between the beginning of said drawing step and the adhesion to said element of a substantially continuous mass of said coagulation substances.

2. The invention according to claim 1 and further including the step of maintaining the temperature of said sample at substantially 37.5° C.

3. The invention according to claim 2 wherein said elongated element is in the nature of a thread.

4. The invention according to claim 2 wherein said measuring step is performed with the aid of automatic equipment responsive to the presence of said coagulation substances on said element.

5. The invention according to claim 2 wherein said measuring step includes generating an electrical signal responsive to the adhesion of said coagulation substances and recording the level of said signal over a period including said time interval.

6. Apparatus for testing blood coagulation comprising in combination:
   (a) a container for holding a blood sample;
   (b) an elongated element to which coagulation substances will adhere;
   (c) means for drawing said element lengthwise through said sample; and
   (d) means for sensing the point on said element at which a substantially continuous mass of said coagulation substances are present.

7. The invention according to claim 6 wherein said element is in the form of a thread.

8. The invention according to claim 7 wherein said thread is a cotton thread.

9. The invention according to claim 7 wherein said sensing means comprise a light source and photosensitive means positioned on opposite sides of said thread to provide a signal commensurate with the intensity of light reaching said photosensitive means as influenced by the amount of said coagulation substances on said thread.

10. The invention according to claim 7 wherein said sensing means comprises an electrical circuit completed by the increased moisture content of said thread by adhesion of said coagulation particles.

References Cited

UNITED STATES PATENTS

| | | | |
|---|---|---|---|
| 3,267,363 | 8/1966 | Young | 23—230 B |
| 3,458,287 | 7/1969 | Gross et al. | 23—230 B |
| 3,525,254 | 8/1970 | Milanes | 73—64.1 |
| 3,605,010 | 9/1971 | Folus | 23—230 B |
| 3,635,678 | 1/1972 | Seitz et al. | 23—230 B |
| 3,766,774 | 10/1973 | Clark | 23—230 B |

RONALD E. SERWIN, Primary Examiner

U.S. Cl. X.R.

23—253 R; 73—64.1; 356—39